(12) United States Patent
Kawanishi

(10) Patent No.: US 9,879,805 B2
(45) Date of Patent: Jan. 30, 2018

(54) PIPE COUPLING DEVICE AND CONSTRUCTION METHOD THEREFOR

(71) Applicant: SK-KAWANISHI Co., Ltd., Kagawa (JP)

(72) Inventor: Hidehito Kawanishi, Kagawa (JP)

(73) Assignee: SK-KAWANISHI Co., Ltd., Kagawa (JP)

( * ) Notice: Subject to any disclaimer, the term of this patent is extended or adjusted under 35 U.S.C. 154(b) by 0 days.

(21) Appl. No.: 15/178,107

(22) Filed: Jun. 9, 2016

(65) Prior Publication Data

US 2016/0290538 A1 Oct. 6, 2016

Related U.S. Application Data

(63) Continuation of application No. PCT/JP2014/082257, filed on Dec. 5, 2014.

(30) Foreign Application Priority Data

Dec. 10, 2013 (JP) .................................. 2013-255195
Aug. 8, 2014 (JP) .................................. 2014-162085

(51) Int. Cl.
*F16L 23/036* (2006.01)
*F16L 21/08* (2006.01)
(Continued)

(52) U.S. Cl.
CPC .............. *F16L 23/036* (2013.01); *F16L 21/08* (2013.01); *F16L 23/032* (2013.01); *F16L 33/32* (2013.01)

(58) Field of Classification Search
USPC .......... 285/12, 337, 339, 341, 343, 348, 420
See application file for complete search history.

(56) References Cited

U.S. PATENT DOCUMENTS 3,334,661 A * 8/1967 Milette ................. F16L 19/005
138/89
4,127,290 A * 11/1978 Mutschlechner ....... F16L 21/08
285/343

(Continued)

FOREIGN PATENT DOCUMENTS

JP H01-150291 U 10/1989
JP H07-198075 A 8/1995

OTHER PUBLICATIONS

International Search Report issued in Application No. PCT/JP2014/082257, dated Mar. 3, 2015.

*Primary Examiner* — Aaron Dunwoody
*Assistant Examiner* — Fannie Kee
(74) *Attorney, Agent, or Firm* — Michael Best & Friedrich LLP

(57) ABSTRACT

A pipe coupling device includes a joint body, a C-shaped retaining ring that includes a flange part radially protruding from an outer peripheral surface of the retaining ring, a pressing plate that includes a recessed part configured to house the flange part, and includes a front wall configured to face a rear end of the flange part. The joint body, the retaining ring, and the pressing plate are coupled together in an axial direction. The flange part has a substantially rectangular shape extending along the axial direction, and an inclined surface is formed on at least one of the rear end and the front wall. An inner end of the inclined surface is positioned closer to the joint body than an outer end thereof. The inner end is closer to a center axis of the joint body than the outer end. A gap is formed between the rear end and the front wall.

10 Claims, 13 Drawing Sheets

(51) Int. Cl.
*F16L 23/032* (2006.01)
*F16L 33/32* (2006.01)

(56) References Cited

U.S. PATENT DOCUMENTS

| | | | |
|---|---|---|---|
| 4,429,903 A * | 2/1984 | Baker | F16K 27/00 |
| | | | 285/24 |
| 4,711,426 A | 12/1987 | Bodnar | |
| 5,342,096 A * | 8/1994 | Bachle | F16L 19/0212 |
| | | | 277/622 |
| 5,803,513 A * | 9/1998 | Richardson | F16L 21/08 |
| | | | 285/337 |

* cited by examiner

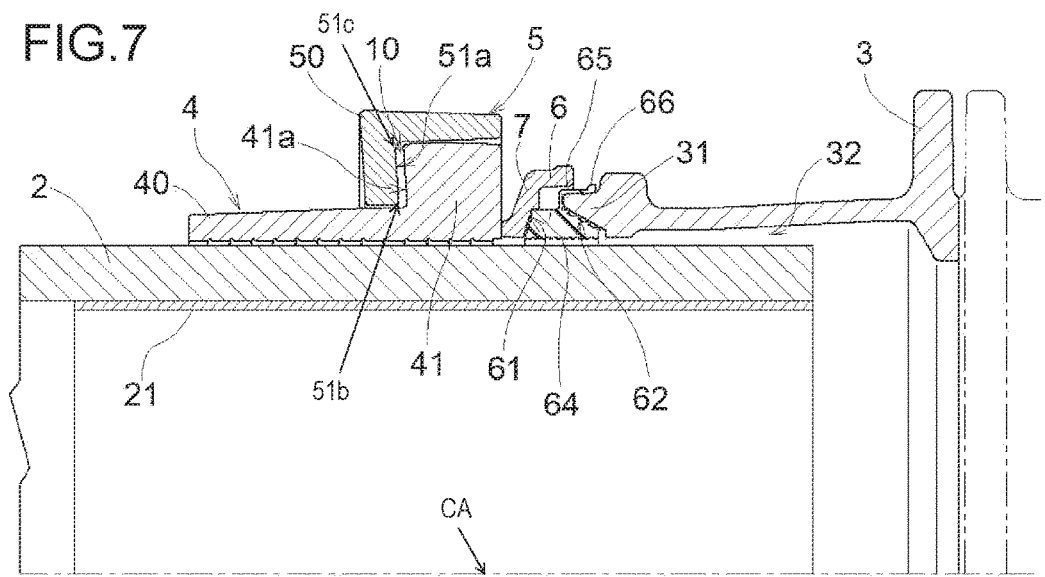
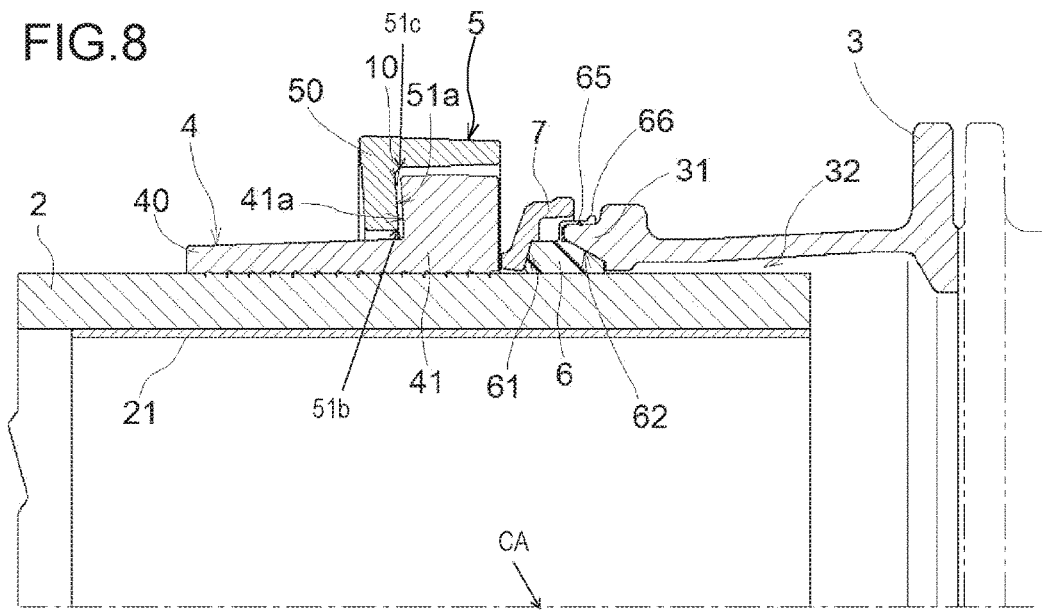

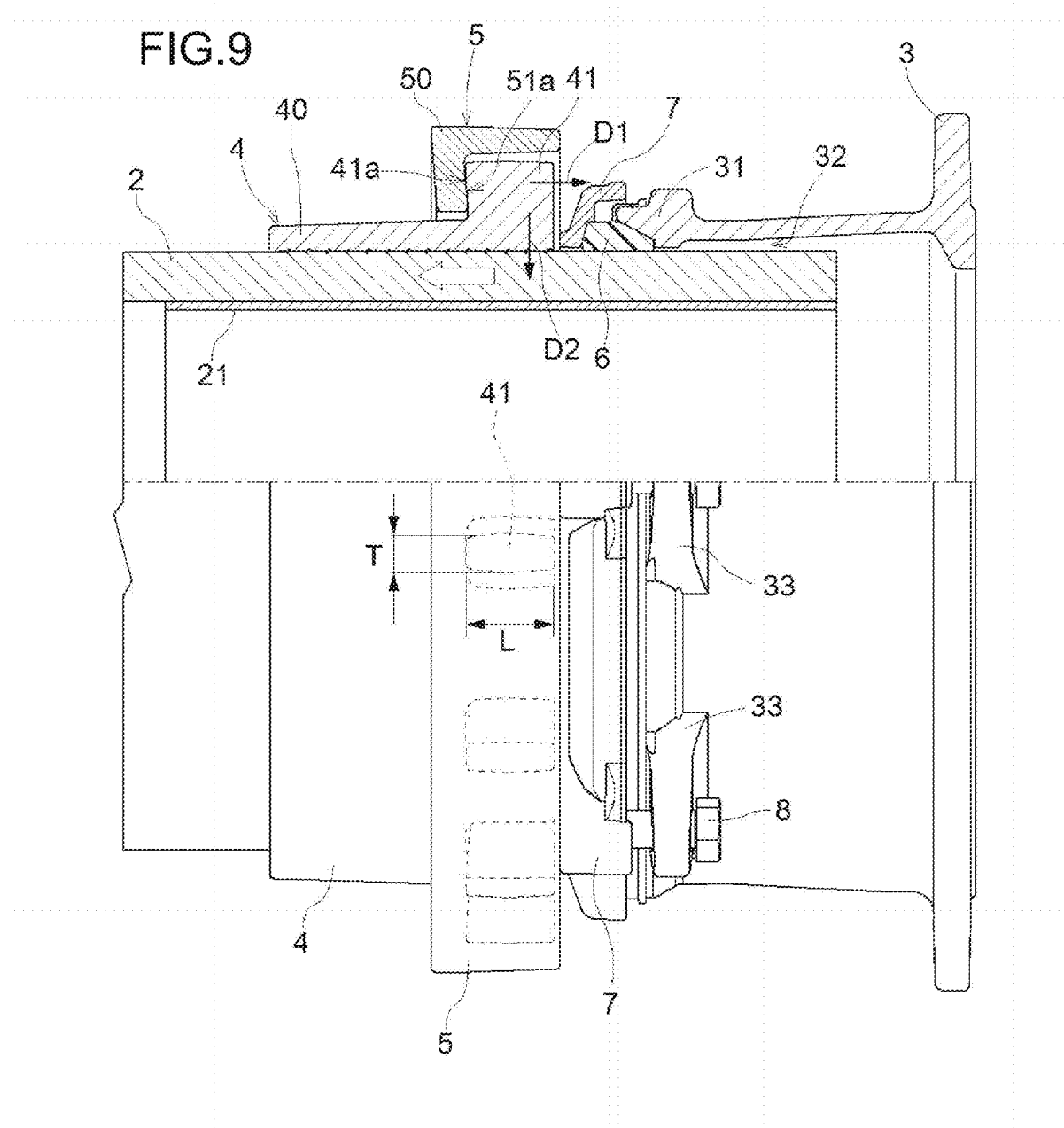

PIPE COUPLING DEVICE AND CONSTRUCTION METHOD THEREFOR

RELATED APPLICATIONS

This is a continuation of PCT/JP2014/082257 filed on Dec. 5, 2014 claiming Conventional priorities based on Japanese Patent Application Nos. 2013-255195 filed on Dec. 10, 2013 and 2014-162085 filed on Aug. 8, 2014, the contents of these applications of which, including specifications, claims and drawings, are incorporated herein by reference in their entirety.

TECHNICAL FIELD

The present invention relates to a pipe coupling device and a construction method therefor. More specifically, the present invention relates to a pipe coupling device that couples, by use of a coupler, a joint body into which a joining pipe is inserted, a C-shaped retaining ring which includes a flange part protruding from the outer peripheral surface thereof, the C-shaped retaining ring is fastened and fixed with a fixing member, and a pressing plate that includes a recessed part that houses the flange part.

BACKGROUND ART

A pipe coupling device 100, as shown in FIGS. 15A, 15B, 16A and 16B, for example, as a related art, a retaining ring 104 is provided with a plate-like flange part 141 extending in a circumferential direction. A flange part 141 is moveable in a flexibility space S formed between an arm part 105a of a pressing plate 105 and a press ring 107.

SUMMARY OF THE INVENTION

The coupling device of this application includes a joint body, a C-shaped retaining ring that includes a flange part radially protruding from an outer peripheral surface of the retaining ring. The pipe coupling device further includes a pressing plate that includes a recessed part configured to house the flange part. The pressing plate includes a front wall configured to face a rear end of the flange part. The joint body, the retaining ring, and the pressing plate are configured to be coupled together in an axial direction. The flange part has a substantially rectangular shape extending along the axial direction, an inclined surface is formed at least one of the rear end and the front wall. An inner end of the inclined surface is positioned closer to the joint body than an outer end of the inclined surface, wherein the inner end is closer to a center axis of the joint body than the outer end. A gap is formed between the rear end and the front wall.

BRIEF DESCRIPTION OF THE DRAWINGS

FIG. 7 is a cross-sectional view taken along the line VII-VII shown in FIG. 4;

FIG. 8 is a view corresponding to FIG. 7 after the retaining ring is fastened.

FIG. 9 is a half sectional view showing a state where a flange part and a recessed part abut against each other due to a thrust by a pipe;

FIG. 15A shows a state where a flange part and an arm part abut against each other. FIG. 15B shows a deformation state.

DESCRIPTION OF EMBODIMENTS

Next, with reference to FIGS. 1 to 9, the present invention will be described more specifically. It should be noted that, in the embodiments below, the front side (forward) means a joint body 3 side of each member, and the rear side (rearward) means the opposite side thereto.

Figure 1:
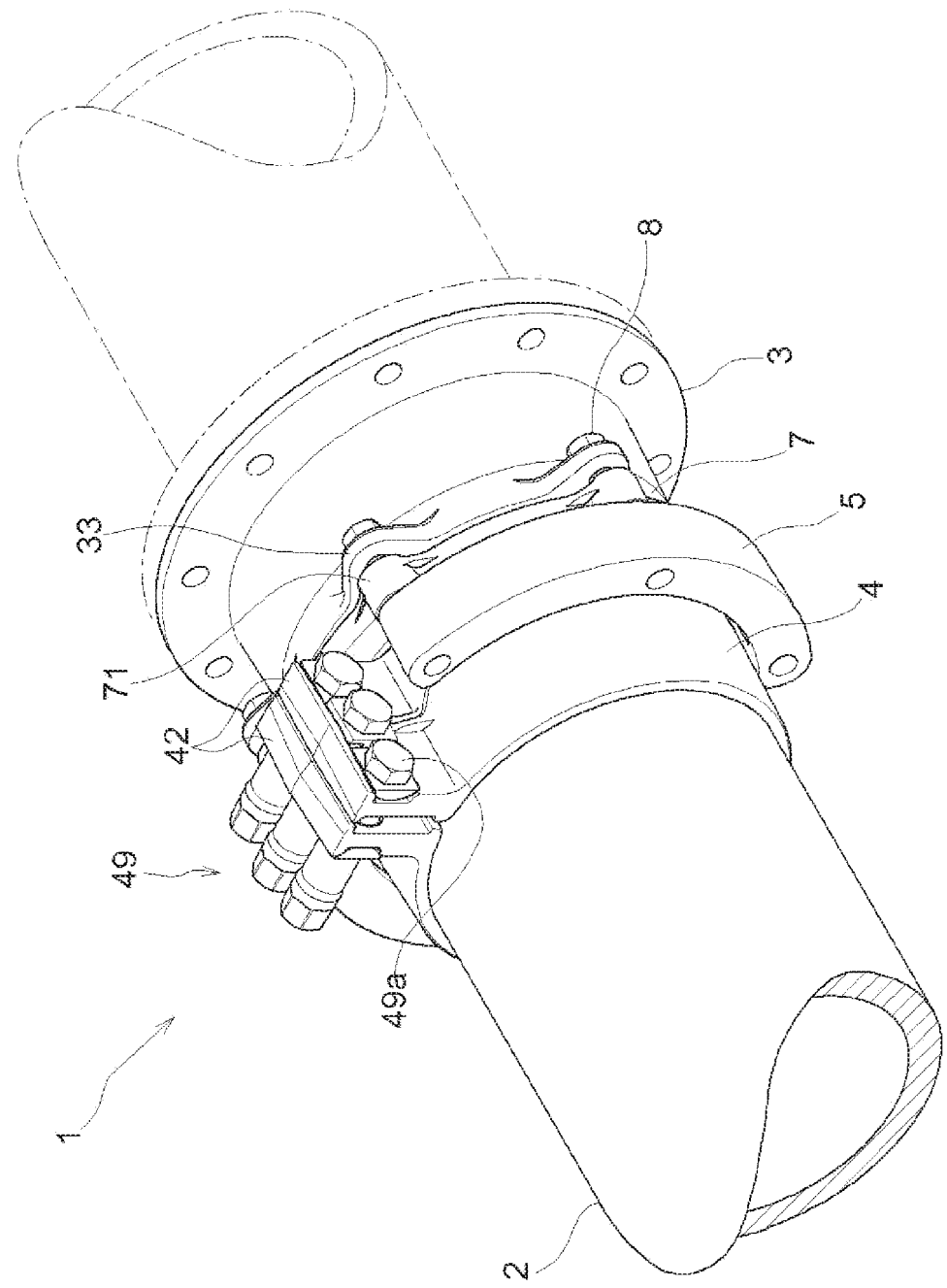
FIG. 1 is a perspective view of a pipe coupling device according to the present invention.
Figure 2:
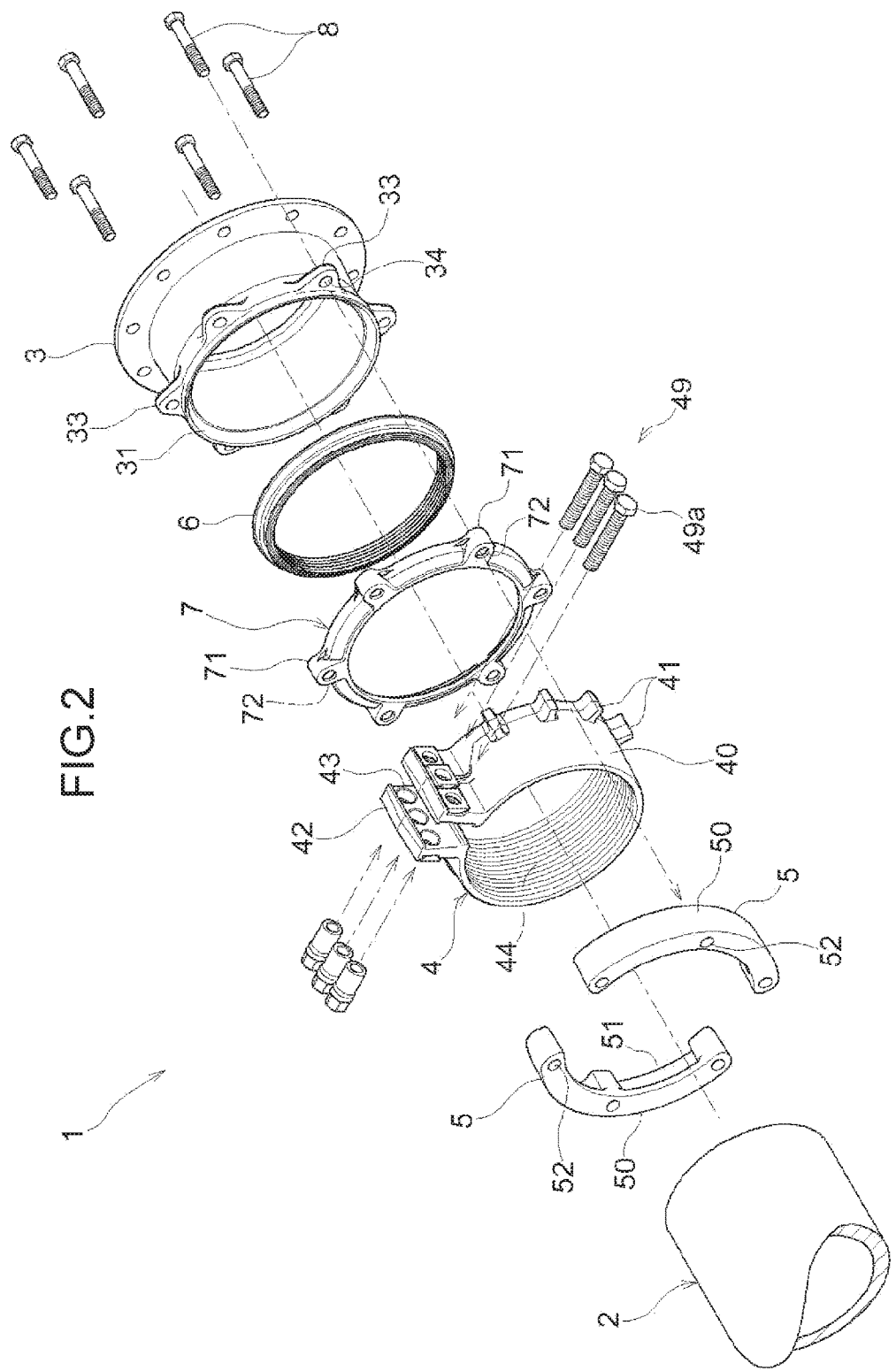
FIG. 2 is an exploded perspective view of the pipe coupling device according to the present invention.
Figure 3:
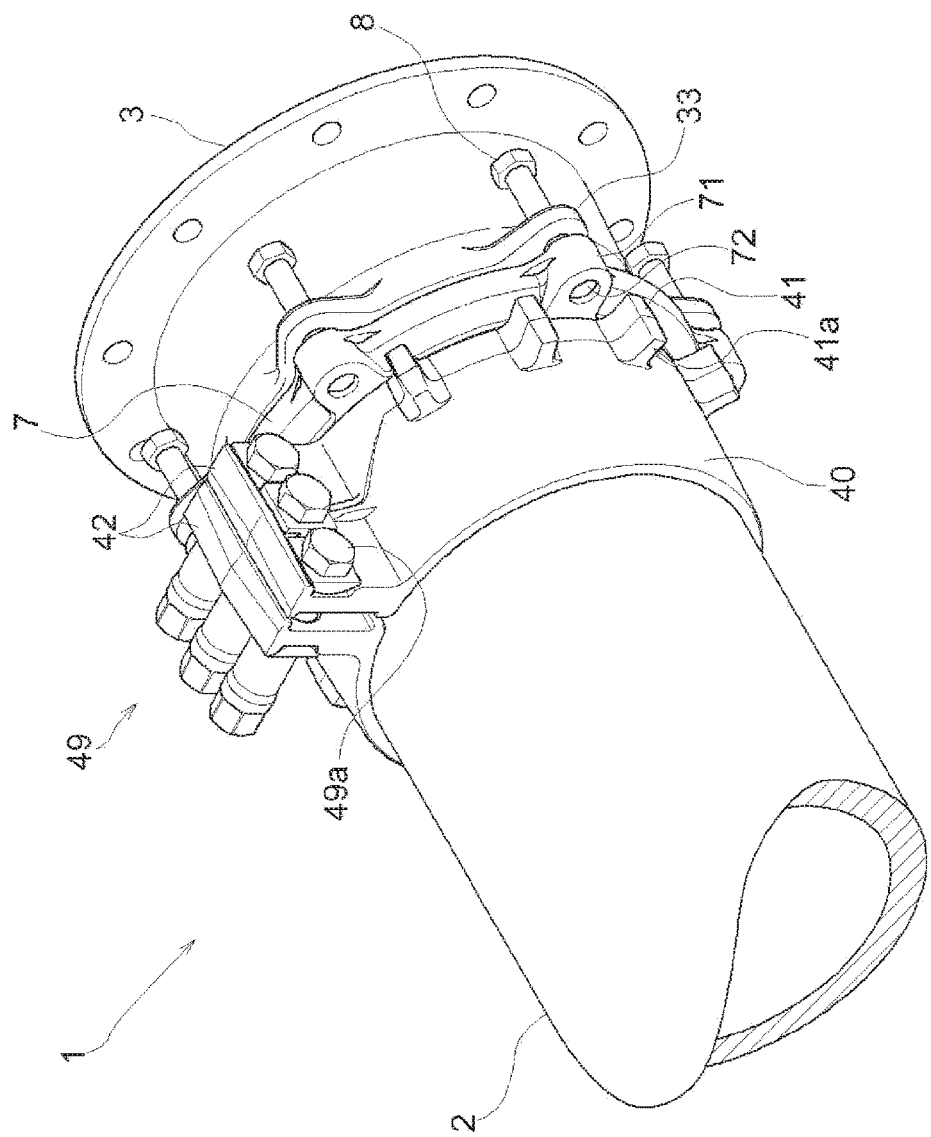
FIG. 3 is a view corresponding to FIG. 1 in a state where a pressing plate is removed.

As shown in FIGS. 1 to 3, in general, a pipe coupling device 1 for a pipe joint according to the present invention includes: a joint body 3 into which a joining pipe 2 is inserted; a C-shaped retaining ring 4 which includes flange parts 41 each protruding from the outer peripheral surface thereof and which is fastened and fixed by a fixing member 49 onto the outer peripheral surface of the joining pipe 2; and pressing plates 5 which include recessed parts 51 for housing the flange parts 41, wherein the joint body 3, the retaining ring 4, and the pressing plates 5 are coupled and fixed together by securing bolts 8 serving as the coupler. In addition, a packing 6 is mounted to a socket part 31 of the joint body 3, and a press ring 7 presses the packing 6 through the pressing plates 5 by being secured by the securing bolts 8. It should be noted that, in the present embodiment, as the securing bolts 8, six hexagon head bolts are used.

In the present embodiment, the joining pipe 2 is a polyethylene pipe for water distribution (PE100), for example. In the case of a polyethylene pipe, the pipe itself deforms (stretches and flexes), and thus, deforms in association with deformation of the retaining ring 4 under a thrust caused by tensile force toward the pipe axial direction which occurs in the joining pipe 2. Even with respect to such a flexible plastic pipe, the pipe coupling device 1 according to the present invention prevents deformation or breakage of the retaining ring 4, the pressing plates 5, and the like, improves the pipe holding power, and ensures a tensile strength not less than the tensile yield strength (20 MPa) of the polyethylene pipe. It should be noted that, in the present embodiment, a metal in-core 21 is internally fitted in a portion corresponding to an end of the joining pipe 2 to a fastening portion of the retaining ring 4.

As shown in FIGS. 1, 2, 5, and 6, in general, the joint body 3 includes: the socket part 31 which has a tapered shape and to which the packing 6 is mounted; and a cavity 32 in which an end portion of the joining pipe 2 is located, and ribs 33 are provided so as to stand from the outer periphery of the joint body 3 at intervals as appropriate along the circumferential direction thereof. Each rib 33 has formed therein a through-hole 34 through which the securing bolt 8 is inserted.

As shown in FIGS. 1 to 5, the retaining ring 4 includes: a ring body 40 having a C-shape; a plurality of flange parts 41 which each protrudes from the outer peripheral surface of the ring body 40; and a pair of protruding pieces 42 which respectively protrude outward from opposite ends of the ring body 40. In each protruding piece 42, a plurality of through-holes 43 through which bolts 49*a* as the fixing member 49 are inserted are provided in parallel. In addition, an annular teeth part 44 for suppressing the joining pipe 2 from slipping is formed on the inner surface of the ring body 40.

Figure 4:
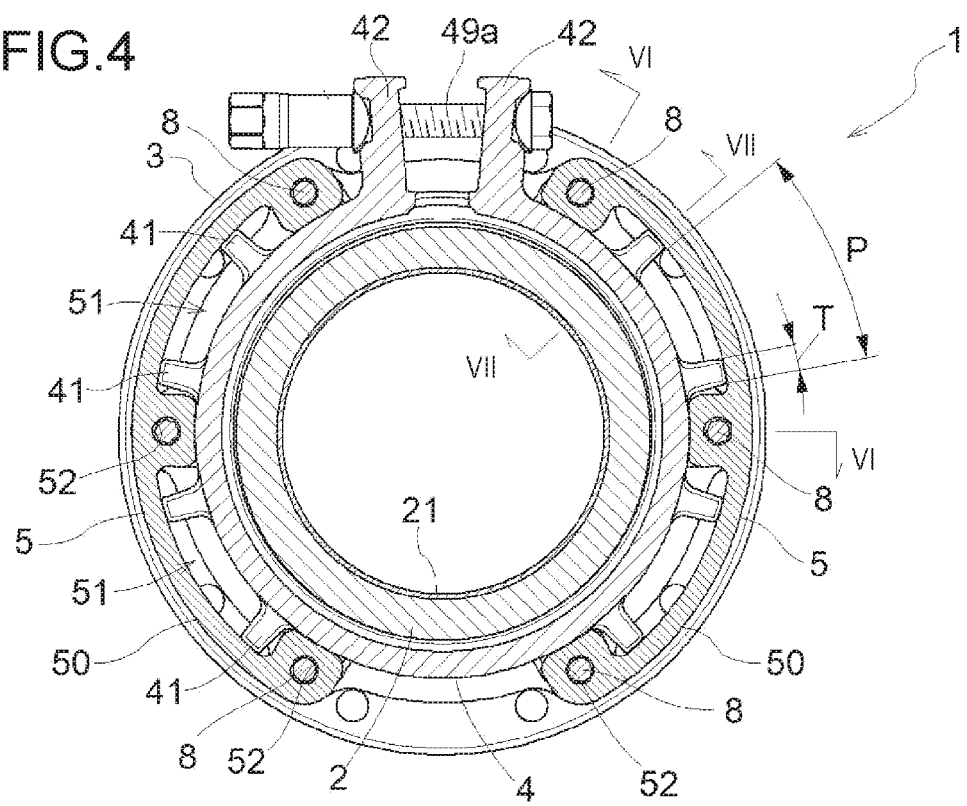
FIG. 4 is a longitudinal cross-sectional view before a retaining ring is fastened.
Figure 5:
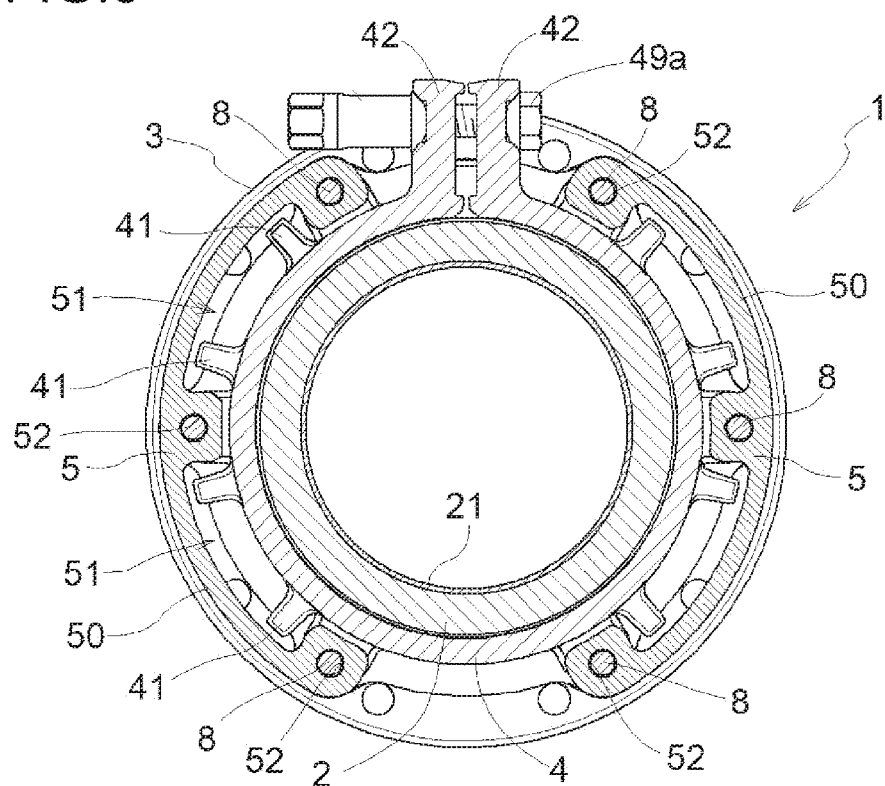
FIG. 5 is a longitudinal cross-sectional view after the retaining ring is fastened.

As shown in FIGS. 3 to 5, eight flange parts 41 are provided at intervals as appropriate along the circumferential direction, and two flange parts 41, assumed as one set, are housed in each recessed part 51 of each pressing plate 5. Each flange part 41 extends along the pipe axial direction such that a length L thereof in the axial direction is greater than a thickness T thereof in the circumferential direction. In the present embodiment, the length L in the axial direction is about twice the thickness T in the circumferential direction. However, it is sufficient that the length L in the axial direction is not less than 1.5 times the thickness T in the circumferential direction. As shown in FIG. 9, if the length L in the axial direction is not less than 1.5 times, deformation of the flange part 41 toward the front side and the pipe axis side as indicated by arrows D1 and D2 can be suppressed against the thrust of the pipe. The thickness T is about the thickness of the ring body 40. Accordingly, even if the retaining ring 4 and the pressing plate 5 abut against each other under the thrust of the joining pipe 2, since the flange part 41 is narrow in the circumferential direction and long in the axial direction, deformation of the flange part 41 toward the joint body 3 side can be prevented, and thus, the pipe holding power is improved.

Further, as shown in FIGS. 7 and 8, at the rear end of the flange part 41, a rear end surface 41*a* as an inclined surface which is inclined rearward (the pressing plate 5 side) is formed. The rear end surface 41*a* faces a front wall surface 51*a* of the recessed part 51 described later. Ever if the retaining ring 4 and the pressing plate 5 abut against each other under the thrust of the joining pipe 2, the pressing plate 5 moves toward the pipe axis side relative to the retaining ring 4, due to the rear end surface 41*a* and the front wall surface 51*a* being inclined surfaces. Thus, disengagement of the retaining ring 4 from the pressing plate 5 can be prevented, and furthermore, the pipe holding power is improved. In addition, between the rear end surface 41*a* and the front wall surface 51*a*, a gap 10 in a shape inclined rearward (i.e., in the direction away from the joint body 3) is formed. As shown in FIG. 8, the gap 10 is formed such that the rear end surface 41*a* and the front wall surface 51*a* do not come into contact with each other after the securing bolts 8 are tightened and the diameter of the retaining ring 4 is reduced.

As described above, each flange part 41 extends along the pipe axial direction and is narrow in the circumferential direction. Although the diameter of the ring body 40 is reduced due to the fastening and fixing by the fixing member 49, the degree of the reduction in the diameter of the portion of the ring body 40 that correspond to each flange part 41 is small (the diameter is less likely to be reduced), and the diameter of the other portions is more reduced than that of the portion corresponding to each flange part 41. Since each flange part 41 extends along the pipe axial direction, and is narrow in the circumferential direction, with the thickness T in the circumferential direction of the flange part 41 being small relative to a pitch P of the flange part 41, for example, influence of the flange part 41 on the reduction in the diameter of the ring body 40 can be reduced. Accordingly, fastening of the ring body 40 can be easily and uniformly performed with a low fastening force, and the pipe holding power is also improved. In addition, by arranging the flange parts 41 substantially symmetrically relative to the pipe axis, the diameter can be more uniformly reduced.

In particular, with respect to the polyethylene pipe 2, as the outer diameter of the pipe is increased, the tensile strength (thrust) toward the pipe axial direction is increased, accordingly. For example, when the yield point stress is assumed to be 20 MPa, the tensile strength according to calculation is 81 kN when the nominal diameter of the pipe is 100, 168 kN when the nominal diameter of the pipe is 150, 320 kN when the nominal diameter of the pipe is 200, and 540 kN when the nominal diameter of the pipe is 250. In order to ensure the pipe holding power against such a high tensile strength, the polyethylene pipe 2 is compressed by the in-core 21 and the retaining ring 4 to cause the teeth part 44 on the inner surface of the retaining ring 4 to bite the polyethylene pipe 2. Thus, as the outer diameter of the pipe is increased, the fastening force (torque) is also increased, accordingly. Due to the presence of the flange parts 41 as described above, the portions having no flange part 41 which occupy the most part of the ring body 40 can be gradually deformed (the diameter is reduced) within the elastic region into a substantially circular shape. Thus, increase of the fastening force can be suppressed, the diameter can be reduced with a lower fastening force, and workability can also be improved. In addition, deformation and breakage of the retaining ring 4 and the pressing plate 5 can be prevented against such a high tensile strength (thrust).

As shown in FIGS. 1, 2, 4, and 5, the pressing plate 5 includes: an arc-shaped body part 50 extending along the outer peripheral surface of the retaining ring 4; the recessed parts 51 each for housing the flange parts 41; and through-holes 52 through each of which the securing bolt 8 is inserted. In the present embodiment, a thread groove is formed in the inner surface of each through-hole 52, and the securing bolt 8 is thread-engaged with the thread groove. The through-holes 52 are provided at three positions of the opposite end portions and a substantially center portion of the body part 50, and between each two adjacent through-holes 52 thereof, the recessed part 51 is provided. By providing the through-holes 52 not only at the opposite end portions of but also at an intermediate portion of the body part 50, deformation (lifting from the press ring 7) of the pressing plate 5 can be suppressed, and further, the pipe holding power is improved. In addition, a pair of the pressing plates 5 are disposed so as to be substantially symmetrical relative to the pipe axis on the outer peripheral surface of the ring body 40 of the retaining ring 4.

On the front wall portion of the recessed part 51, the front wall surface 51*a* as an inclined surface which is inclined forward (toward the retaining ring 4 side) is formed. In other words, an inner end 51*b* of the inclined front wall surface 51*a* is positioned closer to the joint body 3 than an outer end 51c of the inclined front wall surface 51a. The inner end 51b is closer to a common center axis CA of the joint body 3 and the joining pipe 2 than the outer end 51c. In other words, the inner end 51b is closer to the joining pipe 2 inserted into the joint body 3 than the outer end 51c. By the front wall surface 51a being disposed so as to face the rear end surface 41a of the flange part 41 described above, the gap 10 in a shape inclined rearward relative to the joint body 3 is formed.

As shown in FIGS. 2 and 6 to 8, the packing 6 has an annular shape, and on the outer peripheral surface of the packing 6, taper surfaces 61 and 62 are formed so as to face the press ring 7 and the socket part 31 of the joint body 3. Projections 64 are provided on the taper surfaces 61 and 62 and an inner peripheral surface 63. Further, on the outer peripheral surface of the packing 6, a positioning rib is provided which is composed of: a first extension portion 65 which extends toward the inner peripheral surface of the press ring 7 that is to be externally fitted onto the outer peripheral surface of the joint body 3; and a second extension portion 66 which further protrudes in the outer diameter direction in front of the front end surface of the press ring 7. Accordingly, the joint body 3, the packing 6, and the press ring 7 can be temporarily assembled while being concentrically held together, which facilitates insertion of the joining pipe 2 without requiring disassembling.

Figure 6:
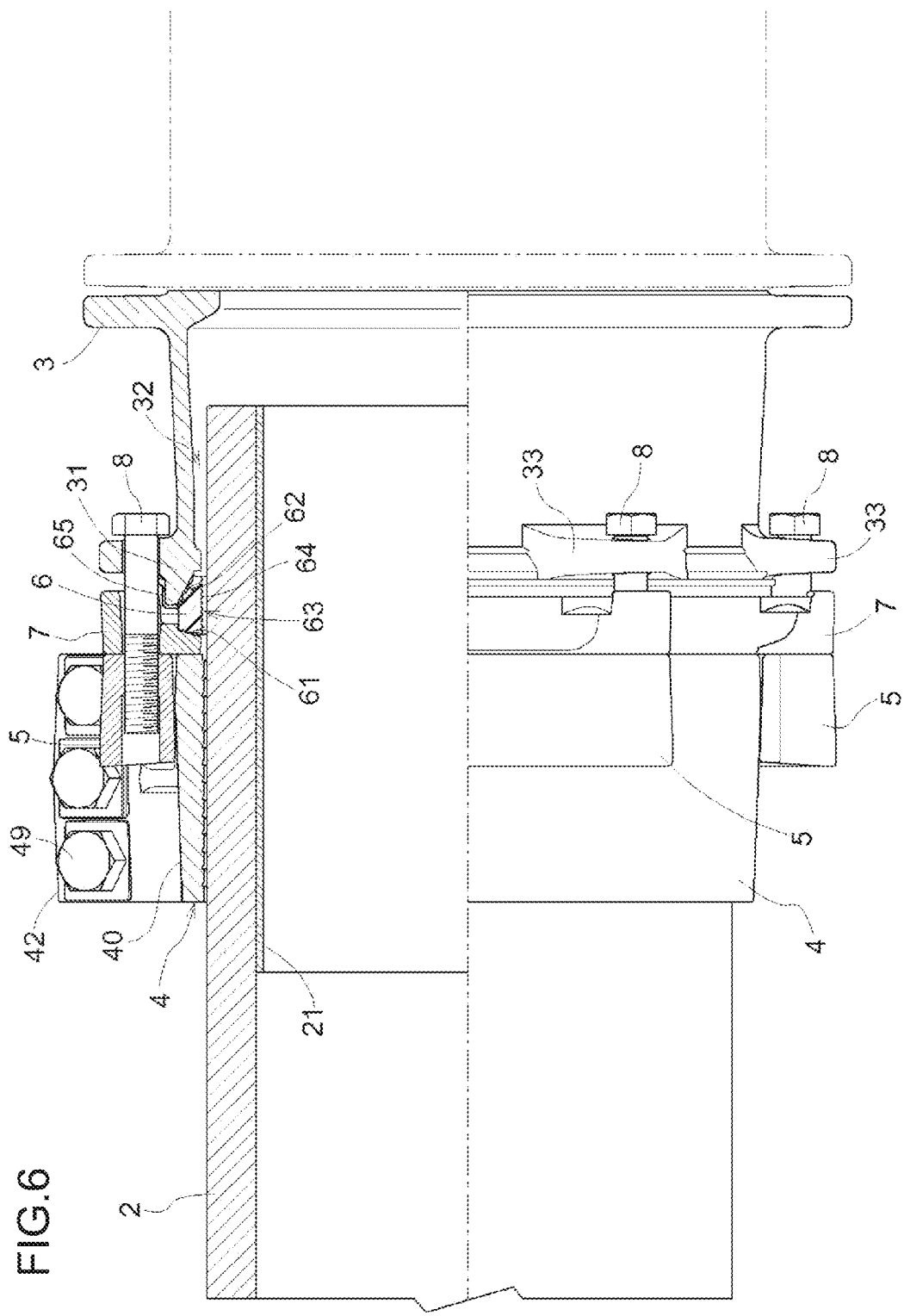
FIG. 6 is a half sectional view taken along the line VI-VI shown in FIG. 4.

As shown in FIGS. 2 and 6, the press ring 7 has an annular shape, and is provided with, at intervals as appropriate, ribs 71 each having a through-hole 72 through which the securing bolt 8 is inserted. The through-hole 72 corresponds to the through-holes 34 and 52 described above. The press ring 7 presses the packing 6 to the socket part 31 of the joint body 3 by being secured by the securing bolts 8, to ensure the water tightness and the pipe holding power by the packing 6.

Here, a construction method (mounting procedure) for the pipe coupling device will be described.

In the present embodiment, the packing 6 is internally fitted onto the socket part 31 of the joint body 3, and the press ring 7, the retaining ring 4, and each pressing plate 5 are temporarily assembled with the securing bolts 8 in advance, so as to be located in this order from behind the packing 6. The rear end surface 41a of each flange part 41 and the front wall surface 51a of its corresponding recessed part 51 are disposed so as to face each other, and between the flange part 41 of the retaining ring 4 and the recessed part 51 of the pressing plate 5, the gap 10 in an inclined shape is formed.

In the temporarily assembled state, the joining pipe 2 is inserted into the joint body 3 to be secured with the securing bolts 8. Accordingly, the pressing plate 5 and the press ring 7 are moved to the joint body 3 side, and the press ring 7 presses the packing 6 to the socket part 31. In the packing 6 pressed by the press ring 7, the taper surfaces thereof are compressed and deformed and thus the diameter of the packing 6 is reduced, whereby the contact force with the joining pipe 2 is increased, and the water tightness is improved. In addition, the pipe holding power is also increased, and the joining pipe 2 is temporarily held. As shown in FIG. 8, also in this state, the gap 10 in the inclined shape is maintained, and the rear end surface 41a and the front wall surface 51a do not come into contact with each other.

Next, the ring body 40 of the retaining ring 4 is fastened with the fixing member 49. As shown in FIGS. 4 and 5, associated with the reduction in the diameter of the ring body 40, the flange part 41 is moved toward the pipe axis side, and thus, the rear end surface 41a of the flange part 41 approaches the front wall surface 51a of the recessed part 51, whereby the gap 10 is reduced. Here, when the width of the gap 10 is small, the flange part 41 abuts against the recessed part 51, associated with the reduction in the diameter of the ring body 40, and thus, the pressing plate 5 inhibits the reduction in the diameter thereof, thus causing insufficient fastening. As shown in FIG. 8, by forming the gap 10 such that the rear end surface 41a and the front wall surface 51a do not come into contact with each other also after the fastening has been performed and the diameter has been reduced, the pressing plate 5 does not inhibit reduction in the diameter of the ring body 40, and thus, the diameter of the retaining ring 4 can be reliably reduced, and a sufficient pipe holding power can be ensured.

Meanwhile, different from the above-described procedure, in a case where fastening and fixing of the retaining ring 4 are performed first and then, securing by the securing bolts 8 are performed, the recessed part 51 of the pressing plate 5 and the flange part 41 of the retaining ring 4 abut against each other, and when securing is further performed, the joining pipe 2 begins to enter the joint body 3. Here, when the joining pipe 2 has been inserted into the joint body 3 too much, the joining pipe 2 comes into contact with an insertion stop part inside the joint body 3, and movement of the joining pipe 2 is restricted. Accordingly, the pressing of the packing 6 by the press ring 7 becomes insufficient, whereby the water tightness cannot be ensured. Moreover, in a state where the joining pipe 2 cannot be sufficiently inserted into the joint body 3 when the joining is performed at the last joining position, securing by the securing bolts 8 is difficult to be performed, the pressing to the packing 6 becomes insufficient, and the water tightness cannot be ensured. For these reasons, securing by the securing bolt 8 is performed before the retaining ring 4 is fastened.

Lastly, the possibility of still another embodiment of the present invention will be described. It should be noted that like members as those in the embodiment described above are denoted by the same reference characters.

In the above embodiment, the polyethylene pipe 2 has been described as an example of the joining pipe. However, instead of the polyethylene pipe, a plastic pipe such as a vinyl chloride pipe may be used, for example. Further, not being limited to such plastic pipes, the present invention can be applied to a metal pipe such as, for example, a ductile cast iron pipe, an SUS pipe, or a steel pipe. However, these metal pipes do not have stretchability and flexibility, and thus, the gap 10 having the inclined shape formed between the retaining ring 4 and the pressing plate 5 may be formed so as to be greater than in the above embodiment, thereby allowing the flange part 41 to move within the gap 10. Accordingly, stretchability and flexibility can be provided.

Figure 10A:
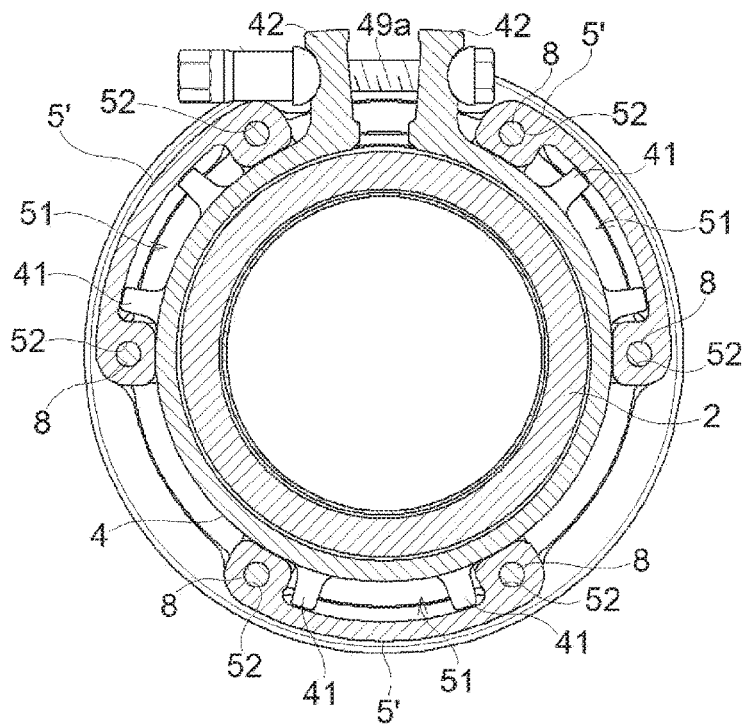
FIG. 10A is a view corresponding to FIG. 4 according to another embodiment.
Figure 10B:
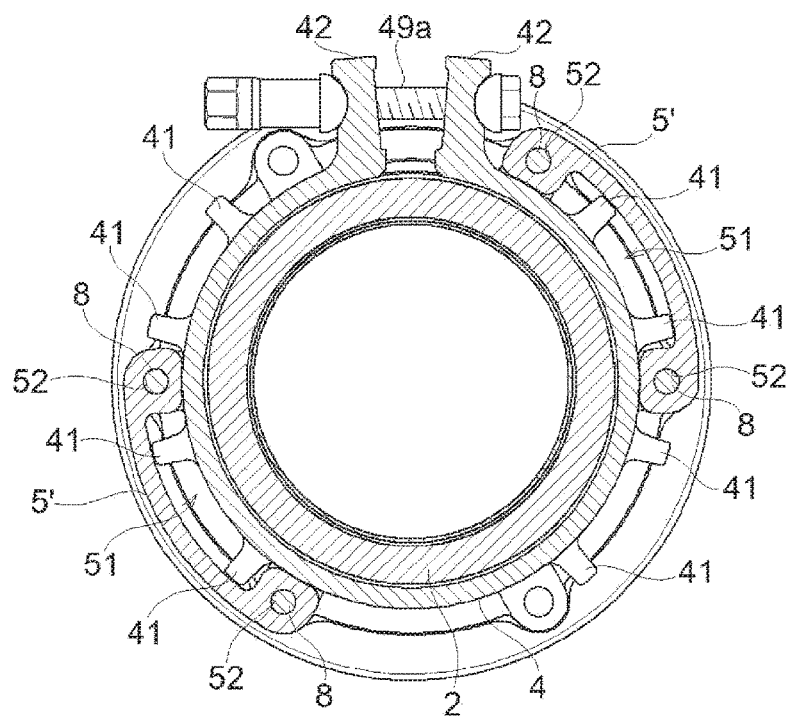
FIG. 10B shows a modification of FIG. 10A.
Figure 10C:
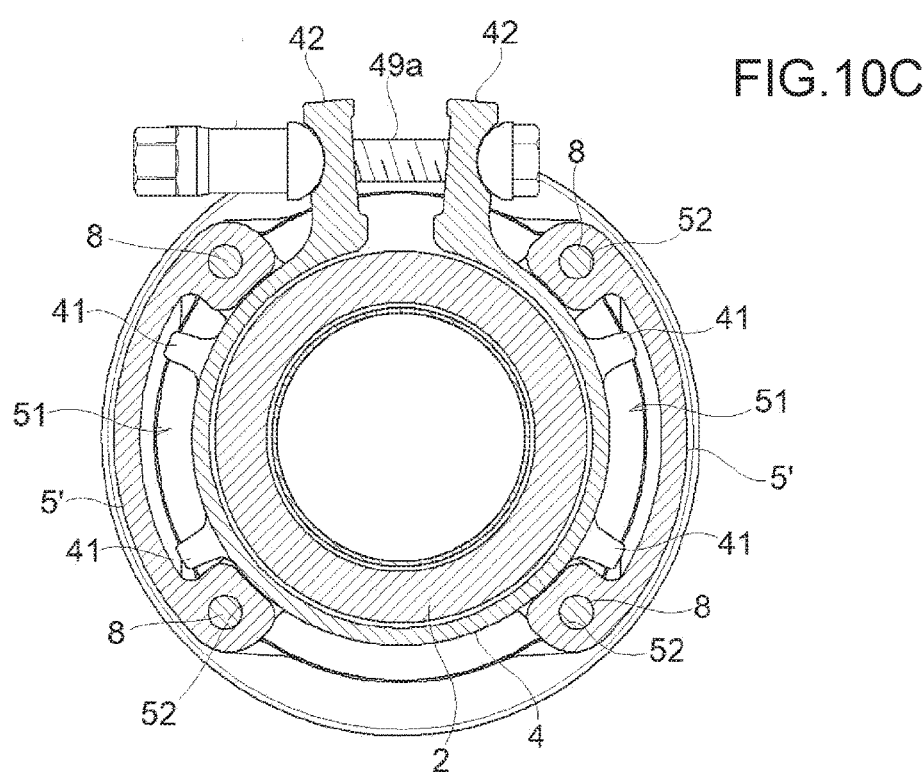
FIG. 10C shows another modification of FIG. 10A.

In above embodiment, the through-holes 52 through which the securing bolts 8 are passed are provided at three positions of the opposite end portions and the substantially center portion of the pressing plate 5. However, as shown in FIGS. 10A to 10C, the through-holes 52 may be provided at opposite end portions of the pressing plate 5'. For example, in the example shown in FIG. 10A, for six securing bolts 8, three pressing plates 5' are disposed along the pipe circumferential direction. Further, six flange parts 41 are provided in the retaining ring 4, and two flange parts 41, assumed as one set, are housed in each recessed part 51 of each pressing plate 5'. Here, in a case where detachment force is small, for example, as shown in FIG. 10B, it is also possible to dispose two pressing plates 5' for six securing bolts 8. Furthermore, as shown in FIG. 10C, two pressing plates 5' are disposed for four securing bolts 8.

Figure 11:
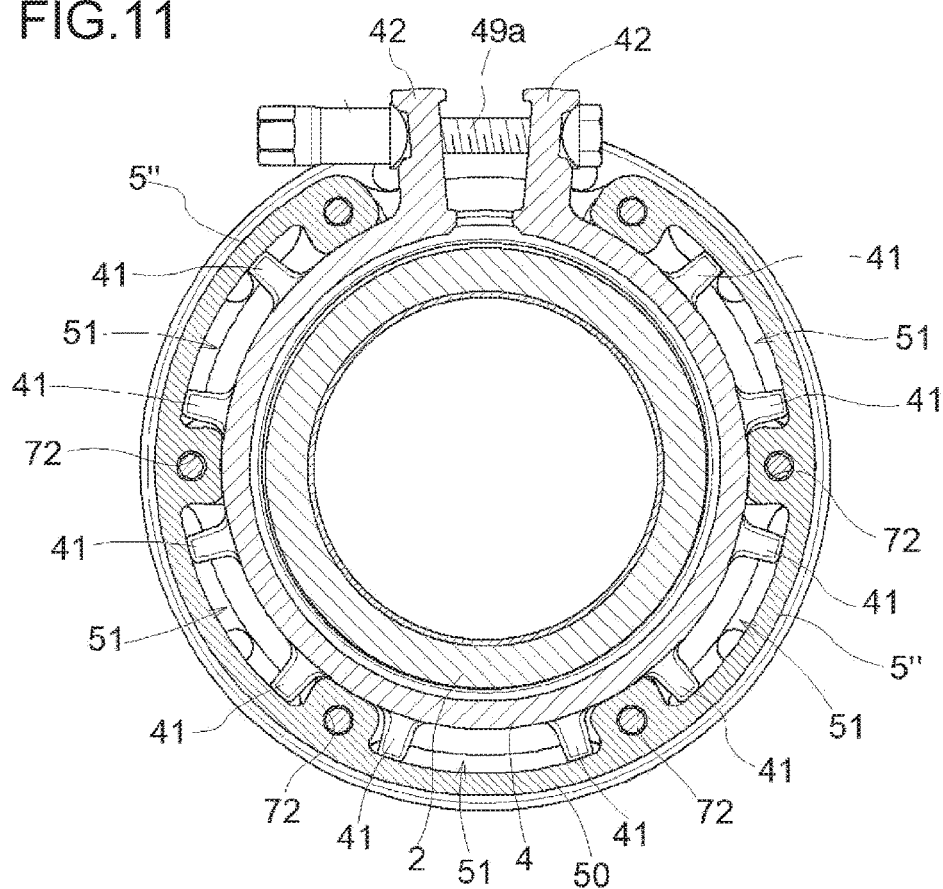
FIG. 11 is a view corresponding to FIG. 4 according to still another embodiment.

Further, the number of the through-holes 52 is not limited to those shown above, and it is also possible to provide four or more through-holes 52 in each pressing plate 5. Also, the number of the pressing plates 5 is not necessarily limited to a number that allows two pressing plates 5 to be paired. For example, as shown in FIG. 11, one pressing plate 5″ having a C shape and extending along the entire circumference of the ring body 40 may be used. However, in terms of production cost and handling, the above embodiment is superior. Of course, three or more pressing plates 5 may be substantially evenly disposed. Thus, the number of the pressing plates 5 and the positions and the number of the through-holes 52 thereof are not limited to those shown in above embodiment.

Figure 12:
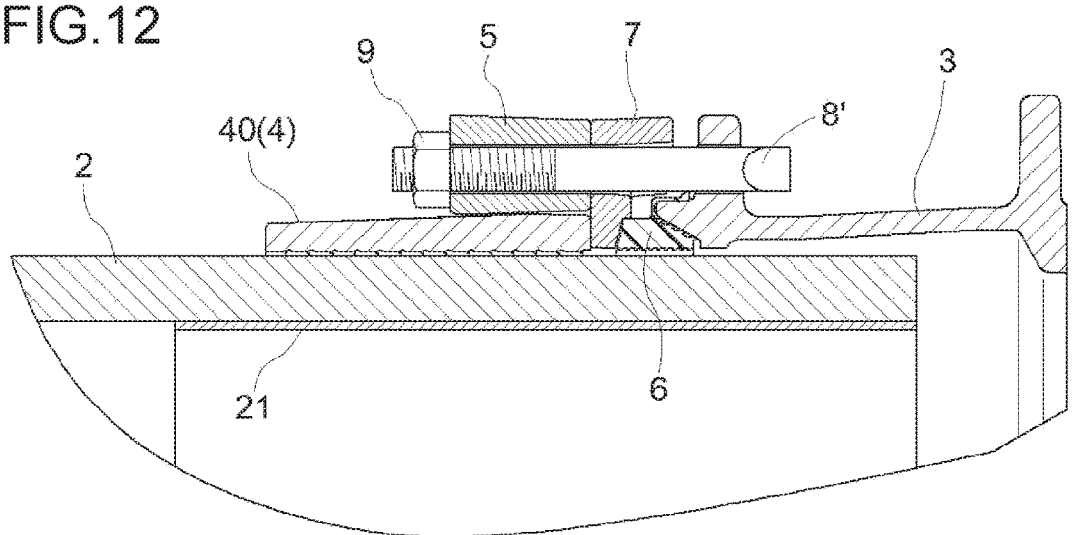
FIG. 12 is an enlarged cross-sectional view of a main part according to still another embodiment.
Figure 13:
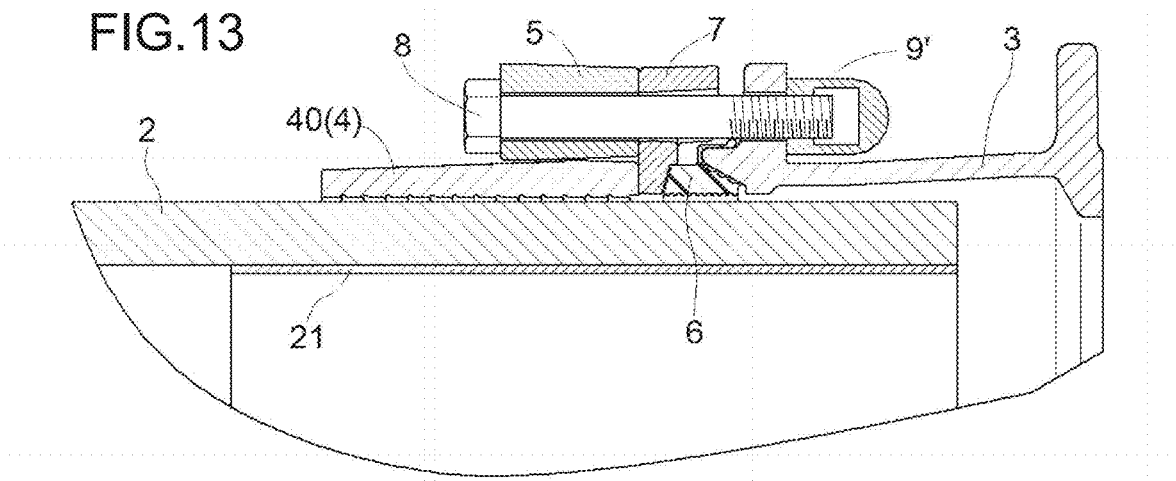
FIG. 13 is an enlarged cross-sectional view of a main part according to still another embodiment.

In the above embodiment, the thread groove is formed on the inner surface of each through-hole 52 of the pressing plate 5, and a hexagon head bolt as the securing bolt 8 is caused to be engaged with the thread groove. However, as shown in FIG. 12, for example, a T-head bolt 8' as the securing bolt may be used, and secured with a nut on the rear side of the pressing plate 5, without providing the thread groove on the inner surface of the through-hole 52 of the pressing plate 5. Alternatively, the securing bolt 8 may be inserted into a through-hole with no thread groove formed therein of the pressing plate 5, to be fastened with a nut 9 outside the through-hole. Still alternatively, as shown in FIG. 13, a hexagon head bolt 8 may be inserted from the pressing plate 5 side, to be secured by a cap nut 9' at a portion of the joint body 3. Still alternatively, in the above embodiment, six securing bolts 8 are used as the coupler, but the number of the coupler is not limited thereto. For example, the number of the securing bolts 8 may be increased or decreased in accordance with the bore of the joint, and for example, if the bore is small, four securing bolts 8 may be used, and if the bore is large, eight securing bolts may be used. Thus, the coupler is not limited to that described in the above embodiment.

Figure 14A:
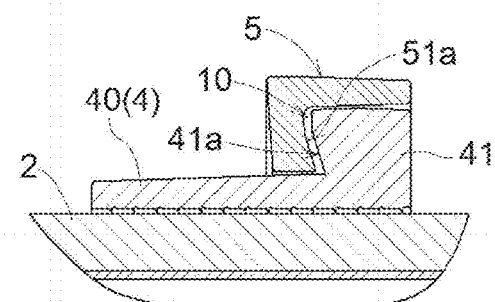
FIGS. 14A, 14B and 14C show enlarged cross-sectional views of a main part showing the relationship between the retaining ring and the pressing plate according to still another embodiment.
Figure 14B:
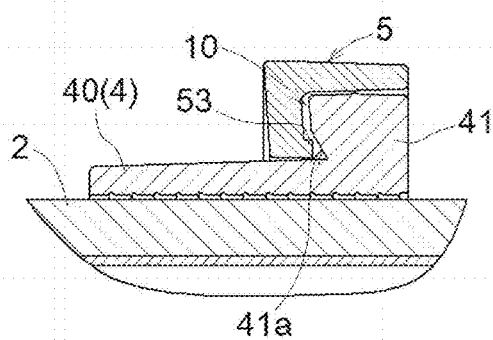
Figure 14C:
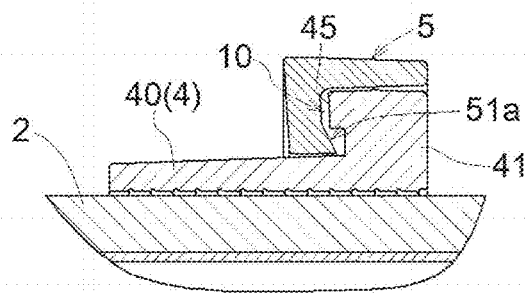
Figure 15A:
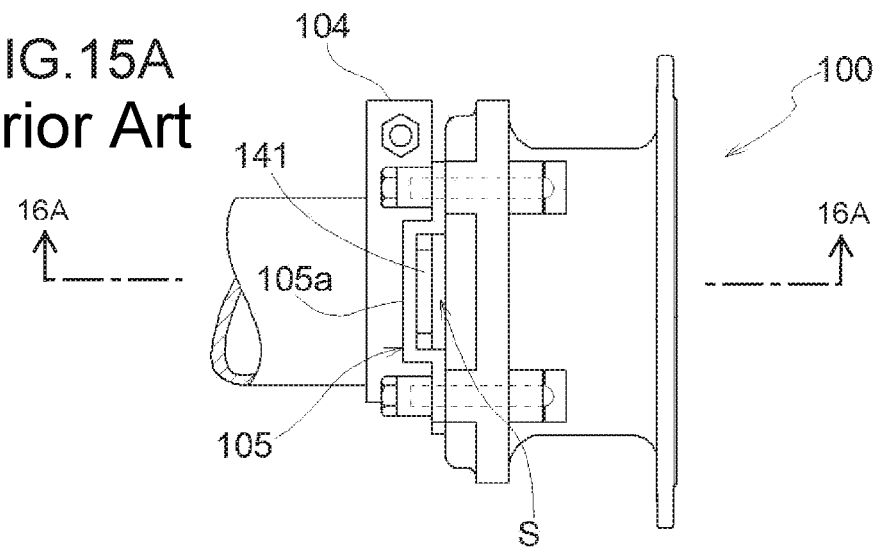
FIG. 15A and FIG. 15B show side views of a pipe coupling device of a related art.
Figure 15B:
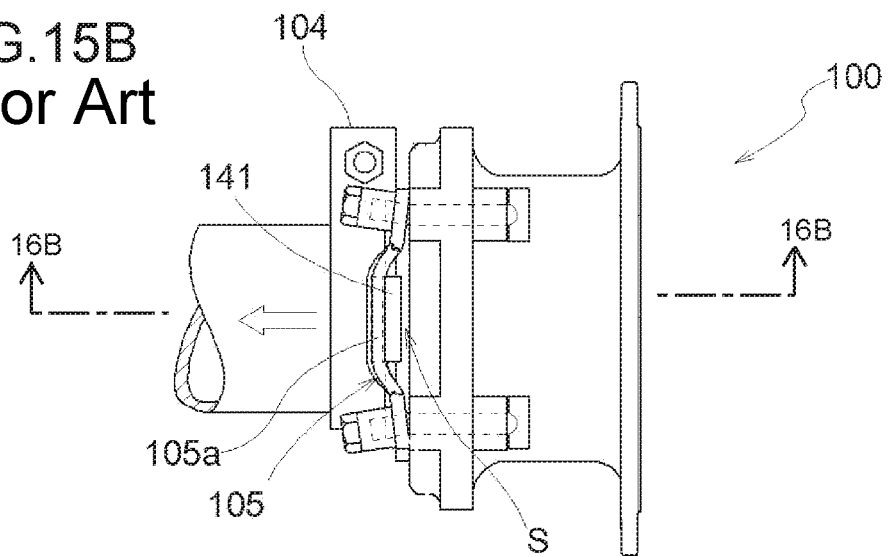
Figure 16A:
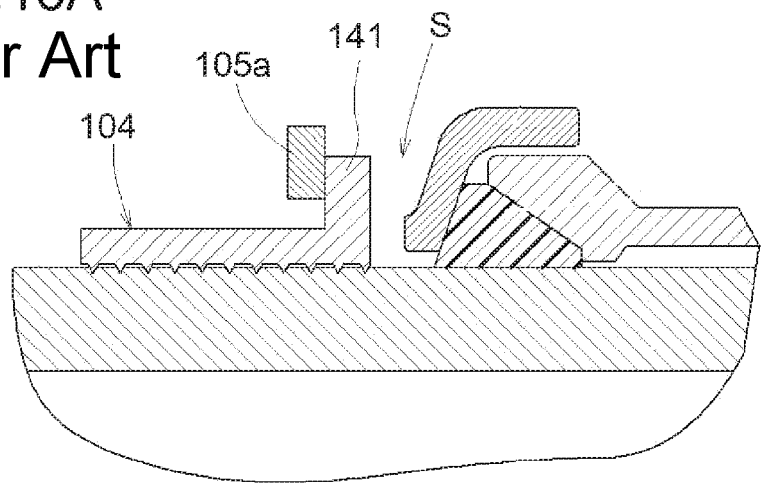
FIGS. 16A and 16B show partially enlarged cross-sectional views of FIGS. 15A and 15B cut along the lines 16A-16A and 16B-16B, respectively.
Figure 16B:
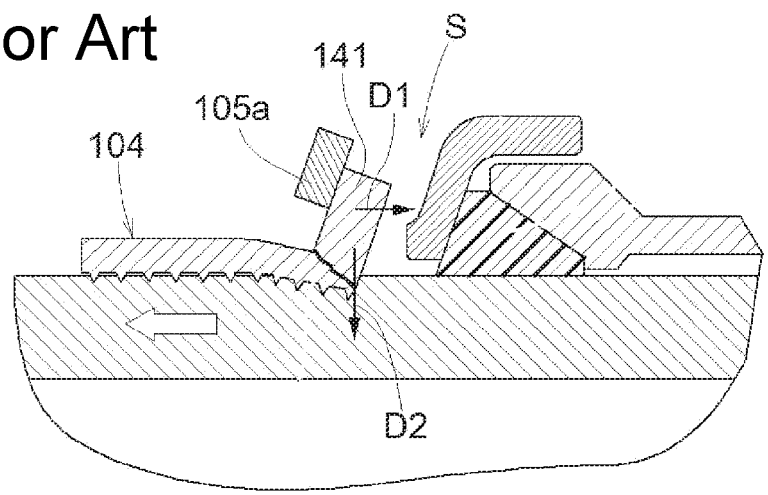

Further, in the above embodiment, the entire surface at the rear end of the flange part 41 is used as the rear end surface 41a serving as the inclined surface which is inclined rearward, the entire surface at the front wall portion of the recessed part 51 is used as the front wall surface 51a serving as the inclined surface which is inclined forward, and by these inclined surfaces, the gap 10 is formed in a shape inclined rearward. However, the forming manner of the gap 10 is not limited to the mode shown in the above embodiment, and for example, as shown in (a) of FIG. 14, inclined surfaces 41a and 51a may be respectively provided in a part at the rear end of the flange part 41 and in a part of the front wall portion of the recessed part 51 so as to face each other. Accordingly, even if the flange part 41 and the recessed part 51 abut against each other, the pressing plate 5 will be guided to the pipe axis side along the inclined surfaces 41a and 51a, and thus, engagement between the retaining ring 4 and the pressing plate 5 becomes strong, and detachment of the pipe can be prevented. Alternatively, as shown in (b) of FIG. 14, an inclined surface 41a which is inclined rearward may be formed in at least a part of the rear end of the flange part 41, and a protrusion 53 which protrudes forward may be provided at the front end of the recessed part 51, whereby the gap 10 may be formed between the inclined surface 41a and the protrusion 53. Still alternatively, as shown in (c) of FIG. 14, the inclined surface 51a which is inclined forward may be formed in at least a part of the front end of the recessed part 51 and a protrusion 45 which protrudes rearward may be provided at the rear end of the flange part 41, whereby the gap 10 may be formed between the inclined surface 51a and the protrusion 45. Also in these modes, the pressing plate 5 will be guided to the pipe axis side along the inclined surfaces 41a and 51a, and thus, engagement between the retaining ring 4 and the pressing plate 5 become strong, and detachment of the pipe is prevented. It should be noted that these modes are merely examples, and the shape, the position, and the like of the inclined portion and the protruding portion may be changed within the range where the pipe holding power and the reduction in the diameter of the retaining ring are not influenced.

In the above embodiment, eight flange parts 41 of the retaining ring 4 are provided along the circumferential direction, and two flange parts 41, assumed as one set, are housed in each recessed part 51 of the pressing plate 5. However, the above embodiment is merely example, and for example, three or more flange parts 41, assumed as one set, may be housed in each recessed part 51. By increasing the number of the flange parts 41 in the recessed part 51, the strength of the pressing plate 5 against the thrust caused by the pipe can be improved.

In the above embodiment, the packing 6 is used in which the projections 64 are provided in the taper surfaces 61 and 62 and the inner peripheral surface 63. However, the present invention is not limited thereto. As long as the water tightness can be ensured, any known sealing means and structure may be employed.

What is claimed is:
1. A pipe coupling device comprising:
   a joint body;
   a C-shaped retaining ring including a flange part radially protruding from an outer peripheral surface of the retaining ring; and
   at least one pressing plate, the at least one pressing plate including a recessed part configured to house the flange part, the at least one pressing plate including a front wall configured to face a rear end of the flange part,
   the joint body, the retaining ring, and the at least one pressing plate are configured to be coupled together in an axial direction, wherein
   the flange part has a substantially rectangular shape extending along the axial direction,
   an inclined surface is formed on one of the rear end and the front wall,
   an inner end of the inclined surface is positioned closer to the joint body than an outer end of the inclined surface, wherein the inner end is closer to a center axis of the joint body than the outer end,
   a gap is formed between the rear end and the front wall.
2. The pipe coupling device according to claim 1, wherein the inclined surface is a first inclined surface formed on the rear end, and the pipe coupling device further comprising a second inclined surface formed on the front wall, wherein the gap is inclined.
3. The pipe coupling device according to claim 1, wherein the rear end includes the inclined surface, the front wall includes a protrusion protruding toward the rear end, and the gap is formed between the inclined surface and the protrusion.
4. The pipe coupling device according to claim 1, wherein the front wall includes the inclined surface, the rear end includes a protrusion protruding toward the front wall, and the gap is formed between the inclined surface and the protrusion.
5. The pipe coupling device according to claim 1, wherein the at least one pressing plate includes through-holes through which a coupler passes at at least three posi- tions of opposite end portions and an intermediate portion of the at least one pressing plate.

6. The pipe coupling device according to claim 1, wherein the at least one pressing plate includes a through-hole through which a coupler passes and couples the joint body, the retaining ring, and the at least one pressing plate.

7. The pipe coupling device according to claim 1, wherein the at least one pressing plate includes a plurality of the pressing plates disposed along a circumferential direction on an outer peripheral surface of a ring body of the retaining ring.

8. The pipe coupling device according to claim 1, wherein the at least one pressing plate has a C-shape extending along an entire circumference of a ring body of the retaining ring, and is disposed on an outer peripheral surface of the ring body.

9. The pipe coupling device according to claim 1, wherein the joint body is configured to receive a joining pipe, the joining pipe being a plastic pipe.

10. A construction method for the pipe coupling device according to claim 1, comprising the steps of:
 inserting a joining pipe into the joint body;
 coupling the joint body, the retaining ring, and the at least one pressing plate; and
 reducing a diameter of the retaining ring.

\* \* \* \* \*